United States Patent
Kirubaharan et al.

(10) Patent No.: US 9,016,153 B2
(45) Date of Patent: Apr. 28, 2015

(54) ADJUSTING DEVICE FOR A VEHICLE SEAT HAVING A SELF-ADJUSTING BRAKE

(75) Inventors: Albert Reginold Kirubaharan, Burscheid (DE); Otto Juergen, Burscheid (DE); Helmut Mai, Düsseldorf (DE); Sachin Chandure, Pune (IN)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 13/885,613

(22) PCT Filed: Nov. 16, 2011

(86) PCT No.: PCT/EP2011/005762
§ 371 (c)(1),
(2), (4) Date: Aug. 6, 2013

(87) PCT Pub. No.: WO2012/065721
PCT Pub. Date: May 24, 2012

(65) Prior Publication Data
US 2013/0319144 A1    Dec. 5, 2013

(30) Foreign Application Priority Data
Nov. 16, 2010 (DE) .......................... 10 2010 051 401

(51) Int. Cl.
*F16H 3/06* (2006.01)
*A47C 7/46* (2006.01)
*B60N 2/225* (2006.01)

(52) U.S. Cl.
CPC .............. *A47C 7/462* (2013.01); *B60N 2/2252* (2013.01); *B60N 2/2254* (2013.01)

(58) Field of Classification Search
CPC .... B60N 2/028; B60N 2/0284; B60N 2/0292; B60N 2/22; B60N 2/2218; B60N 2002/2204; B60N 2/2245; B60N 2/442; A47C 7/49
USPC ................ 74/89.45, 409, 410, 413, 425, 430; 297/180.1, 239, 362, 480, 284.6, 344.1
See application file for complete search history.

(56) References Cited

U.S. PATENT DOCUMENTS 8,292,367 B2 * 10/2012 Park .......................... 297/344.12
8,540,317 B2 * 9/2013 Stilleke et al. ........... 297/362.11
(Continued)

FOREIGN PATENT DOCUMENTS

DE    195 00 914 A1    7/1996
JP    09-187337    7/1997
(Continued)

OTHER PUBLICATIONS

International Preliminary Report on Patentability mailed May 30, 2013, as received in corresponding International Patent Application No. PCT/EP2011/005762.
(Continued)

*Primary Examiner* — William Kelleher
*Assistant Examiner* — Zakaria Elahmadi
(74) *Attorney, Agent, or Firm* — Foley & Lardner LLP

(57) ABSTRACT

An adjusting device for a vehicle component, in particular for the seat back of a vehicle seat, has a first and a second fitting part which are disposed along an axis of rotation. The relative position of the two fitting parts with respect to one another can be changed. A torque is transmitted by a drive to a gear which rolls on the second fitting part and thereby adjusts the second fitting part.

9 Claims, 4 Drawing Sheets

(56) References Cited

U.S. PATENT DOCUMENTS

| | | | |
|---|---|---|---|
| 8,590,972 B2 * | 11/2013 | Jiang et al. | 297/362 |
| 2003/0080599 A1 * | 5/2003 | Hohn et al. | 297/362 |
| 2009/0273218 A1 * | 11/2009 | Park | 297/284.6 |
| 2011/0254337 A1 * | 10/2011 | Jiang et al. | 297/362 |
| 2012/0007402 A1 | 1/2012 | Stilleke et al. | 297/362 |
| 2013/0270889 A1 * | 10/2013 | Karthaus | 297/463.1 |

FOREIGN PATENT DOCUMENTS

| | | |
|---|---|---|
| JP | 2007-521894 A | 8/2007 |
| WO | WO-2005/077707 A1 | 8/2005 |
| WO | WO-2010/102413 A1 | 6/2010 |
| WO | WO-2010/102413 A1 | 9/2010 |
| WO | WO 2010102413 A1 * | 9/2010 |

OTHER PUBLICATIONS

International Search Report received in PCT/EP2011/005762 dated Feb. 6, 2012.

Office Action in corresponding Japanese Patent Application No. 2013-539162 dated Sep. 9, 2014, and English translation, 4 pages.

Office Action dated May 7, 2014 in corresponding Japanese Patent Application No. 2013-539162 along with English translation.

* cited by examiner

ADJUSTING DEVICE FOR A VEHICLE SEAT HAVING A SELF-ADJUSTING BRAKE

CROSS REFERENCE TO RELATED APPLICATIONS

The present application is a National Stage of International Application No. PCT/EP2011/005762 filed on Nov. 16, 2011, which claims the benefit of German Patent Application No. 10 2010 051 401.2 filed on Nov. 16, 2010. The entire disclosures of which are incorporated herein by reference.

The present invention relates to an adjusting device for a vehicle component, in particular for the backrest of a vehicle seat having a first fitting part and a second fitting part which are arranged along a rotational axis, wherein the relative position of the two fitting parts to one another may be altered, wherein a torque is transmitted from a drive unit to a gearwheel which rolls on the second fitting part and, as a result, adjusts the second fitting part. The present invention further relates to a gearwheel of an adjusting device of a vehicle component, in particular the backrest of a motor vehicle seat.

Such adjusting devices, which in the motor vehicle manufacturing industry are also denoted as recliners, for example, are sufficiently well known from the prior art. However, there is the drawback with such adjusting devices that they are self-adjusted as a result of wear and/or vibration, which is undesirable.

It was, therefore, the object of the present invention to provide an adjusting device which does not have the drawbacks of the prior art.

The object is achieved by an adjusting device for a vehicle component, in particular for the backrest of a vehicle seat, having a first fitting part and a second fitting part which are arranged along a rotational axis, wherein the relative position of the two fitting parts to one another may be altered by means of an eccentric which transmits a torque from a drive unit to a gearwheel, so that said gearwheel rolls on the second fitting part, and which preferably comprises two eccentric means, wherein the adjusting device comprises a braking means which at least substantially prevents the self-adjustment thereof and said braking means cooperates with a locking contour which is provided on the gearwheel.

Preferably, the braking means comprises at least one, preferably two, arms which is/are provided, in particular, in a resilient manner. Each arm preferably has at one end thereof a blocking element which prevents the eccentric from being self-adjusted relative to the locking contour which is provided on the gearwheel or a further part of the adjusting device. Each blocking element cooperates in a locking manner in a non-positive and/or positive manner with the locking contour, preferably in a plurality of different positions. The braking means prevents self-adjustment, preferably in both rotational directions, wherein a blocking element preferably blocks in only one rotational direction. The locking contour preferably has a plurality of non-positive and/or positive connecting means, for example teeth or tooth-like structures, which are preferably arranged equidistant from one another. Preferably, the locking contour is arranged in a circular ring-shaped manner.

Preferably, each arm is pretensioned in a resilient manner such that it presses the blocking element against, for example, the locking contour or a further element of the recliner.

Further preferably, the arm comprises a ramp which cooperates, for example, with a drive means and optionally unlocks the braking means thereby, in particular by the arm of the braking means being resiliently deformed counter to the pretensioning direction thereof.

Preferably, the locking contour is provided in the region of the internal diameter of the gearwheel.

Particularly preferably, the locking contour is connected to the gearwheel by a non-positive and/or material connection. Alternatively, the locking contour is provided integrally with the gearwheel. Preferably or according to the invention, the gearwheel comprises a locking contour, in particular on the internal periphery of said gearwheel, for example indentations with which the blocking element of the braking means is able to cooperate in a blocking manner.

A further subject or a preferred subject of the present invention is an adjusting device for a vehicle component, in particular for the backrest of a vehicle seat, having a first fitting part and a second fitting part which are arranged along a rotational axis, wherein the relative position of the two fitting parts to one another is able to be altered by means of a drive unit, which transmits a torque to a gearwheel which rolls in the second fitting part, wherein the axial extent of the bearing of the gearwheel is greater than the axial extent of the teeth of the gearwheel. As a result, the mounting of the gearwheel is more stable.

According to a further preferred or inventive subject of the present invention, the gearwheel has a sealing surface. By means of this sealing surface, dirt, paint or liquid is prevented from entering the adjusting device. Preferably the sealing surface is provided in the radial direction.

Preferably, the sealing surface sealingly cooperates with a cover and/or the drive means of the adjusting device according to the invention.

A further or a preferred subject of the present invention is a gearwheel of an adjusting device, in particular for the backrest of a motor vehicle seat, said gearwheel being provided so that, proceeding from the teeth, it has an axial step on the radial internal side. As a result, a circular ring-shaped surface is produced on which, for example, a retaining plate of the adjusting device and/or a drive means bears, in particular sealingly.

Further preferably or according to the invention, the gearwheel comprises an, in particular smooth, bearing surface for a seal which sealingly cooperates, for example, with a cover and/or a drive means, in order to protect the interior of the adjusting device, in particular, from the application of paint.

The invention is described hereinafter with reference to FIGS. 1-4. These explanations are provided merely by way of example and apply equally to all inventions.

Figure 1:
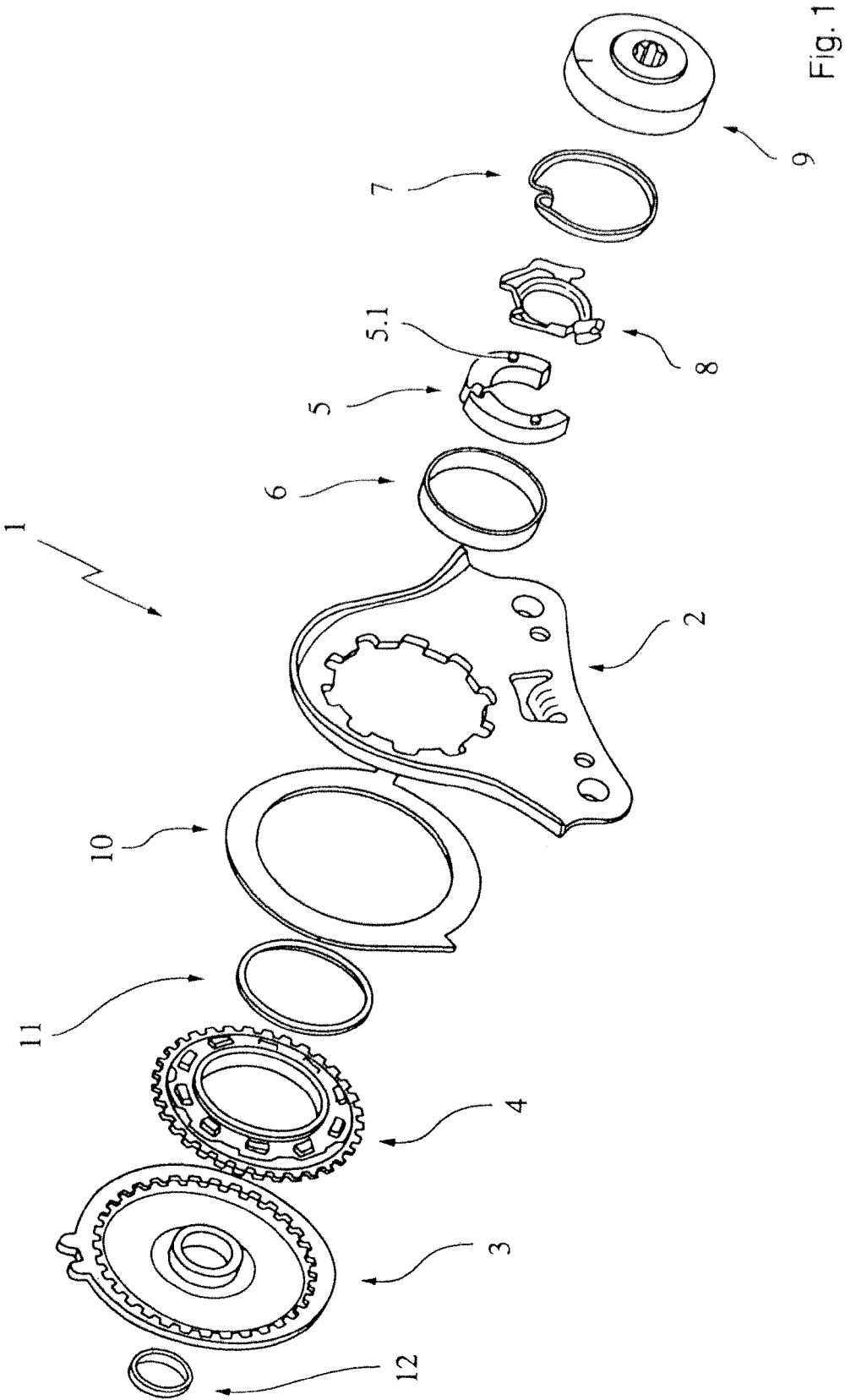
FIG. 1 shows an exploded view of the adjusting device according to the invention.

FIG. 1 shows an exploded view of an embodiment of the adjusting device according to the invention. The adjusting device has a first fitting part 2, the seat part adapter, and a second fitting part 3, the backrest adapter, which is connected directly or indirectly to the backrest of the vehicle seat. The seat adapter 2 is fastened to the vehicle seat, in this case screwed. A gearwheel 4 with an external toothing is rotatably provided on the seat adapter 2, said external toothing cooperating by meshing with the toothing of the backrest adapter, and as a result adjusting the angle of the backrest adapter. The backrest adapter 3 is connected, preferably welded, to the backrest of the vehicle seat. The person skilled in the art recognises that these functionalities of the two adapters 2 and 3 may also be interchanged. The relative position of the backrest adapter 3 relative to the seat adapter 2 is altered by means of an eccentric which has two wedges 5. Said two wedges 5 are preferably arranged symmetrically and particularly preferably mirror-symmetrically to a plane extending through the rotational axis D. The two wedges 5 are forced apart by an energy storage device, in this case a spring 7, preferably an annular spring, the ends thereof in each case engaging in a notch in the wedges 5. The energy storage device 7 forms part of the eccentric. Moreover, the wedges 5 are preferably arranged at least partially in a bearing shell 6 and are supported thereagainst. By means of the bearing shell 6, the friction between the eccentric and the gearwheel 4 may be reduced and uniform running of the eccentric may be achieved. Moreover, the device according to the invention comprises a drive means 9 which is driven manually or in a motorized manner. Said drive means 9 transmits its rotational movement to the eccentric 5 so that when the drive unit 9 rotates the gearwheel 4 rolls in the internally toothed backrest adapter 3.

The eccentric serves, as already mentioned, to drive the externally toothed gearwheel 4 inside an internally toothed outer toothed ring comprising at least one further tooth. Accordingly, this is preferably a so-called wobble gear mechanism.

Figure 2:
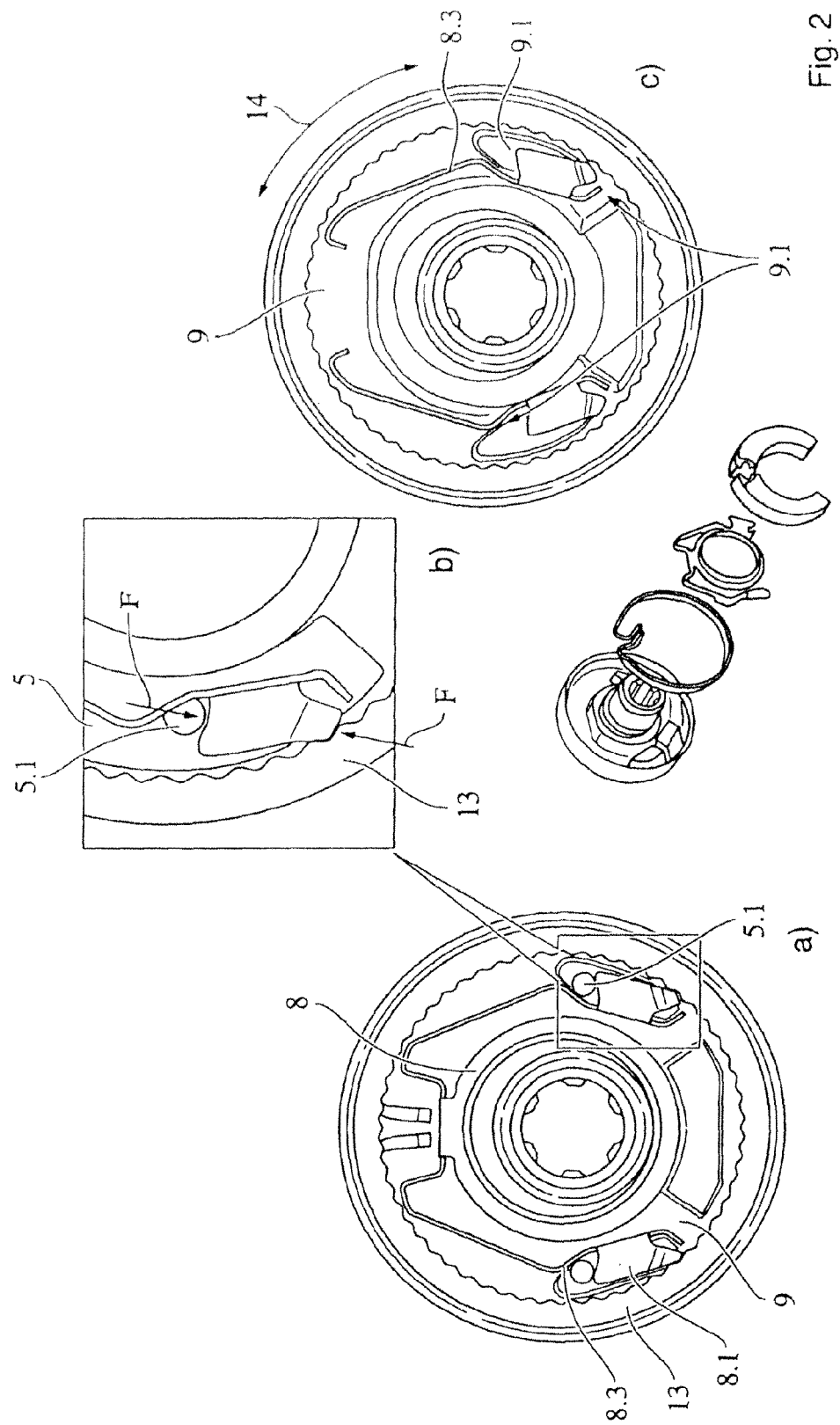
FIG. 2 shows the braking means.

According to the invention, the device comprises a braking means 8 which prevents the first fitting part 2 from being self-adjusted relative to the second fitting part 3, i.e. without the drive means 9 being actuated. FIG. 2 shows a first embodiment of the braking means 8. Said braking means comprises two arms 8.2, a blocking element 8.1 being located in each case at the ends thereof. As may be derived, in particular, from FIG. 2*b*, said blocking element 8.1 cooperates in a blocking manner between a projection 5.1 of the eccentric drive 5 and a locking contour, in this case a fixing ring 13 which in the present case is provided on the gearwheel 4 or integrally with the gearwheel 4, so that self-adjusting forces F are not able to produce a movement of the eccentric relative to the gearwheel 4, for example, or a different part of the adjusting device. Preferably, in each case a blocking element 8.1 acts in a blocking manner in only one rotational direction. The arms 8.2 are pretensioned in the present case so that they pretension the blocking elements 8.1 in each case in the direction of the locking contour 13 into one of the recesses thereof. The unlocking of the braking means 8 is shown in FIG. 2*c*. As soon as the drive means 9 is rotated, as shown for example by the arrow 14, in each case an unlocking means 9.1 cooperates with one respective unlocking ramp 8.3 which is provided, in this case three-dimensionally formed, on the arm 8.2 so that the arm 8.2 is pressed radially inwards and thus the blocking element 8.1 comes out of engagement with the fixing ring 13. Thus the adjusting device may be adjusted by means of the drive means 9 in both rotational directions.

Figure 3:
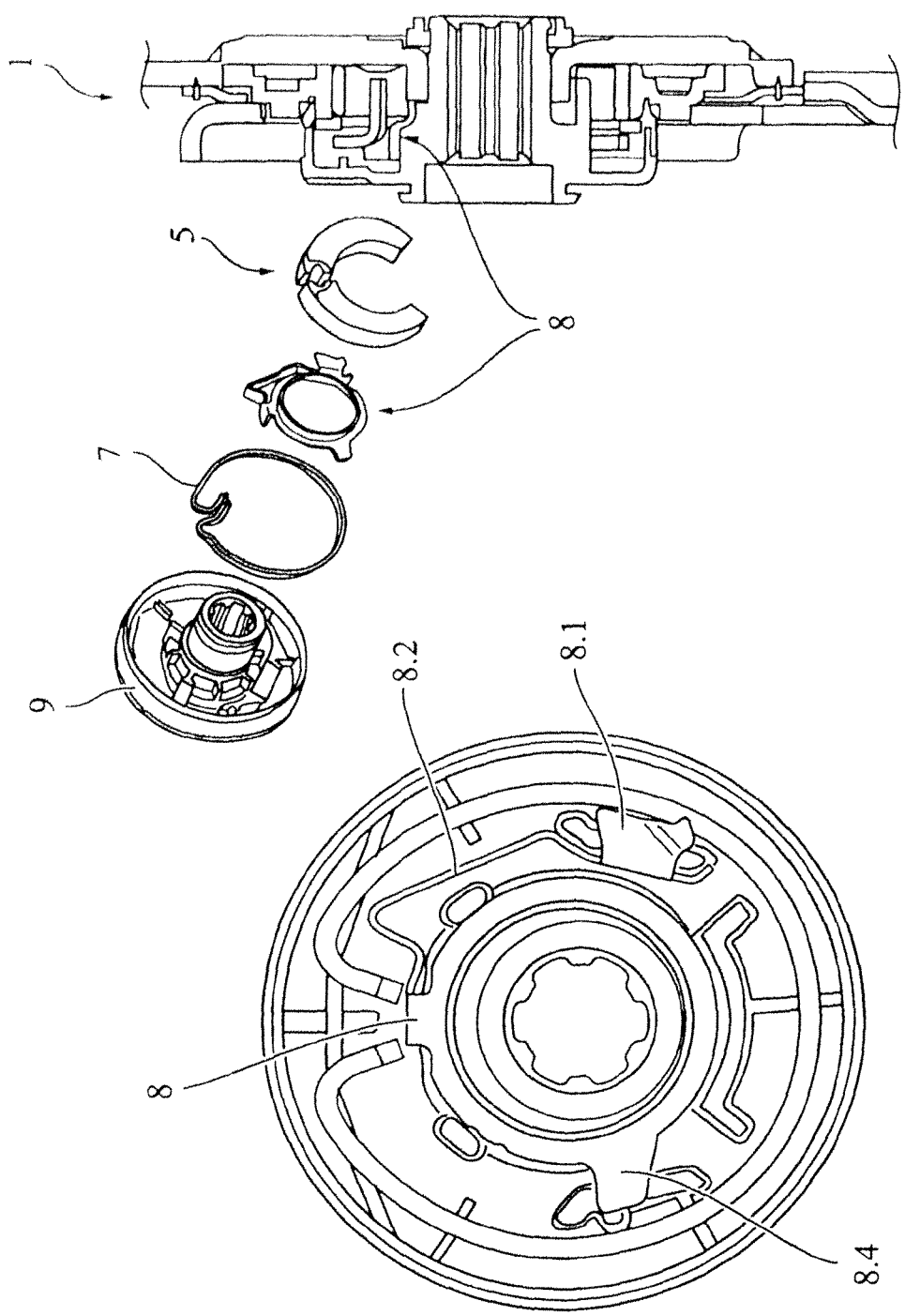
FIG. 3 shows a further embodiment of the braking means.

FIG. 3 shows a specific embodiment of the locking means according to FIG. 2. In the present case, the braking means 8 has only one arm 8.2. A radial arm 8.4 is provided on the other side of the braking means 8, said radial arm not cooperating with the unlocking surfaces 9.1 and permitting over travel in order to avoid rattling noises when rotating the adjusting device.

Figure 4:
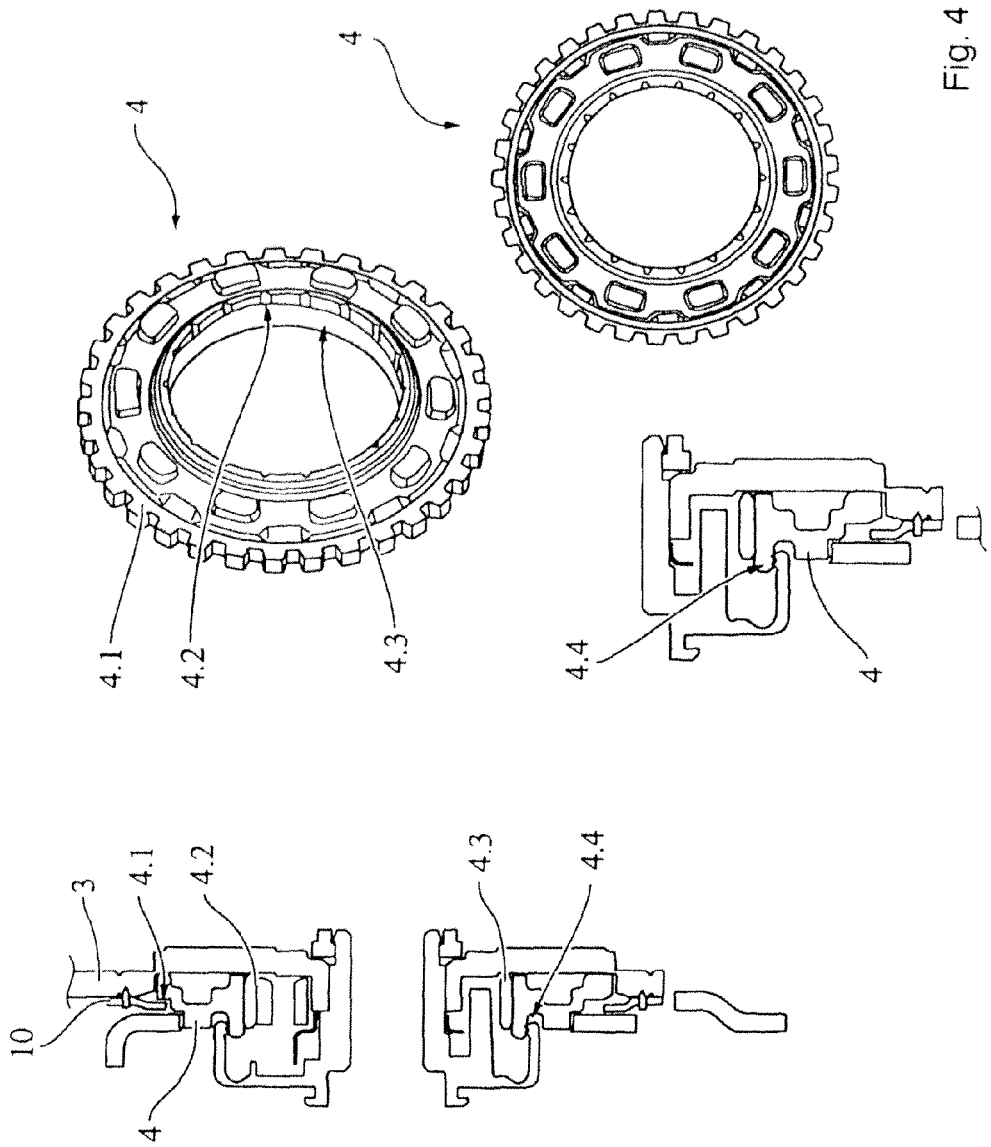
FIG. 4 shows the gearwheel according to the invention.

FIG. 4 shows the gearwheel 4 according to the invention which in the present case has an axial step 4.1 which is provided as a bearing surface, for example for the retaining plate 10. Moreover, in particular in the region of its internal periphery, the gearwheel may have a locking contour 4.2 which is able to cooperate, for example, with the braking means 8. Said locking contour is, for example, integrally formed in the metal plate from which the gearwheel is made. Preferably or according to the invention, the internal bearing 4.3 is provided such that it extends axially to the right and left of the teeth of the gearwheel 4, preferably of identical length in each case in order to provide a more stable mounting of the gearwheel thereby. Further preferably or according to the invention, the gearwheel 4 has a sealing surface 4.4, in this case a circular ring-shaped sealing surface, which, in particular, is of smooth design and sealingly cooperates, for example, with a cover or the drive unit 9 in order, therefore, to protect in particular the interior of the adjusting device from the ingress of dirt and/or paint during painting.

LIST OF REFERENCE NUMERALS

1 Adjusting device
2 First fitting part, seat part adapter
3 Second fitting part
4 Gearwheel
4.1 Axial step, bearing surface
4.2 Locking contour, indentation
4.3 Inner bearing
4.4 Sealing surface
5 Eccentric, wedge segment
5.1 Projection
6 Sliding bearing
7 Spring means
8 Braking means
8.1 Blocking element
8.2 Arm, spring means
8.3 Ramp
8.4 Radial arm
9 Drive means
9.1 Unlocking means, unlocking surface
10 Retaining plate
11 Locking contour, fixing ring
12 Retaining ring
13 Locking contour, fixing ring
14 Arrow
15 Transmission means, torque transmission means
15.1 Ramp
D Rotational axis
F Self-adjusting forces

The invention claimed is:

1. An adjusting device for a vehicle component, comprising:
   a first fitting part and a second fitting part which are arranged along a rotational axis;
   an eccentric that alters the relative position of the first and second fitting parts to one another,
      wherein the eccentric is configured to transmit a torque to a gearwheel,
      wherein the torque is from a drive unit,
      wherein the gearwheel is rollable on the second fitting part,
      wherein the eccentric has two eccentric members; and
   a braking member which at least substantially prevents a self-adjustment thereof,
      wherein the braking member cooperates with a locking contour which is provided on the gearwheel,
      wherein the braking member has only one arm,
      wherein the arm has a blocking element at an end of the arm,
      wherein the blocking element is configured to lock to the locking contour.

2. The adjusting device as claimed in claim 1, wherein the locking contour is provided in a region of an internal diameter of the gearwheel.

3. The adjusting device as claimed in claim 1, wherein the locking contour is connected to the gearwheel by a non-positive and/or material connection.

4. The adjusting device as claimed in claim 1, wherein the locking contour is provided integrally with the gearwheel.

5. The adjusting device as claimed in claim 1, wherein the arm comprises a ramp which cooperates with the drive unit member.

6. The adjusting device as claimed in claim 1, wherein an axial extent of a bearing of the gearwheel is greater than an axial extent of teeth of the gearwheel.

7. The adjusting device as claimed in claim 6, wherein the gearwheel has a sealing surface.

8. The adjusting device as claimed in claim 7, wherein the sealing surface is provided in a radial direction.

9. The adjusting device as claimed in claim 7, wherein the sealing surface sealingly cooperates with a cover and/or the drive unit.

\* \* \* \* \*